United States Patent
Johnson, Jr. et al.

[15] 3,700,726
[45] Oct. 24, 1972

[54] PROCESS FOR THE MANUFACTURE OF GLYCOL ETHER ACETATES

[72] Inventors: Sam H. Johnson, Jr.; Howard N. Wright, Jr., both of Longview, Tex.

[73] Assignee: Eastman Kodak Company, Rochester, N.Y.

[22] Filed: Feb. 19, 1971

[21] Appl. No.: 116,842

[52] U.S. Cl..............260/491, 260/499, 260/638 R, 260/643 R
[51] Int. Cl.............................................C07c 67/02
[58] Field of Search...........260/491, 499, 638 R, 643

[56] References Cited

UNITED STATES PATENTS 2,298,186   10/1942   Woodhouse et al.......260/491
2,822,348   2/1958   Haslam.....................260/491

*Primary Examiner*—Vivian Garner
*Attorney*—Cecil D. Quillen, Jr. and Daniel B. Reece, III

[57]   ABSTRACT

A process for the production of glycol ether acetates according to the reaction:

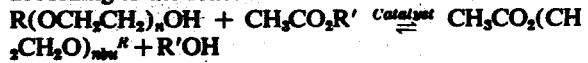

$R(OCH_2CH_2)_nOH + CH_3CO_2R' \rightleftharpoons CH_3CO_2(CH_2CH_2O)_nR + R'OH$ wherein R and R' represent the same or different aliphatic radicals with one to four carbon atoms and $n$ is equal to 1 or 2. Preferred catalysts include aluminum alkoxide, titanium alkoxide and organo-metallic salts. The reaction is conducted at pressures from 25 psia to 150 psia and temperatures of from about 150° C. to about 225° C.

10 Claims, 1 Drawing Figure

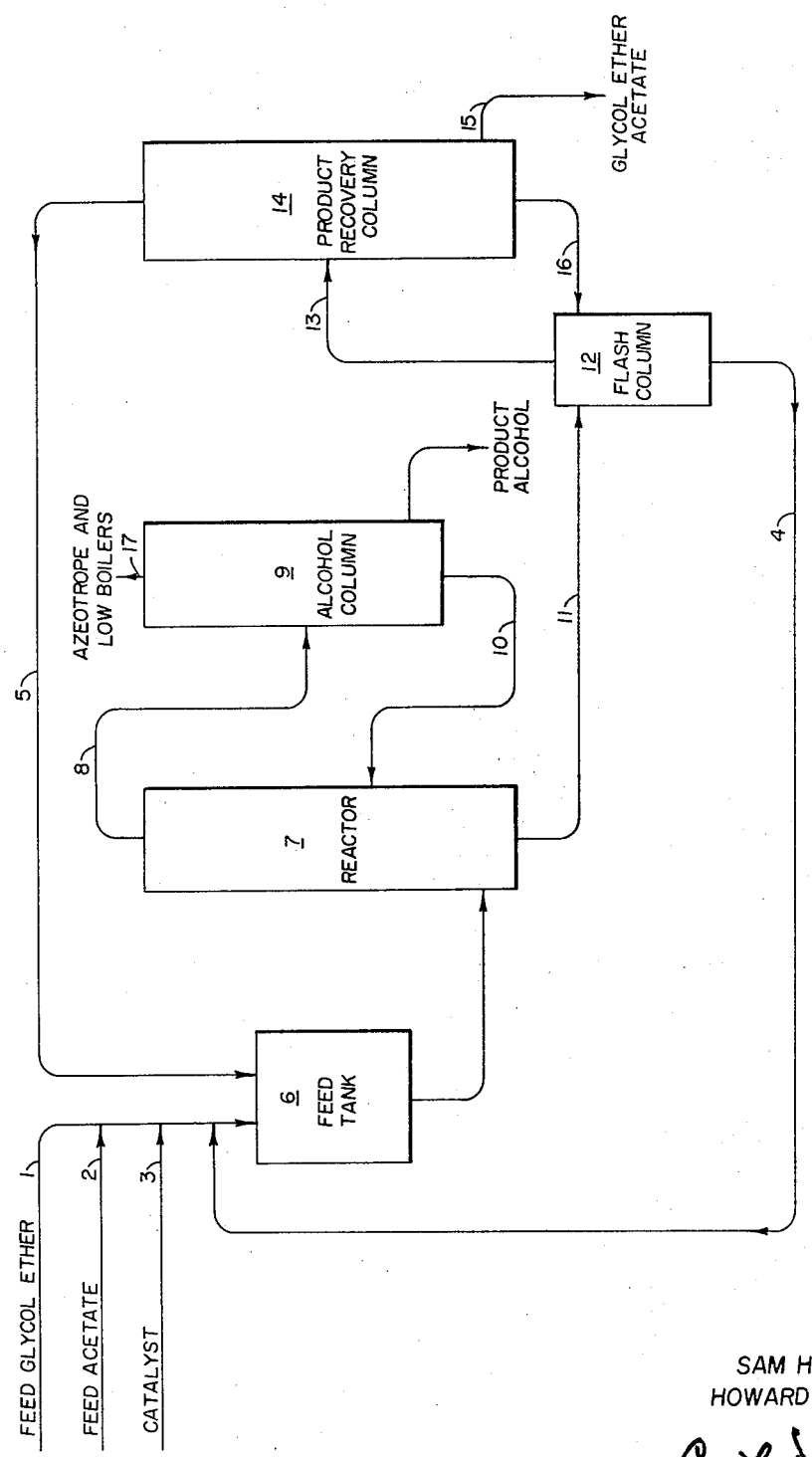

PROCESS FOR THE MANUFACTURE OF GLYCOL ETHER ACETATES

This invention relates to the production of solvent esters useful in paint and lacquer formulations, adhesives, plasticizers, and the like. More specifically, the invention relates to the production of glycol ether acetates by the alcoholysis of a lower acetate, such as isobutyl acetate, with a glycol ether, such as ethylene glycol monoethyl ether.

Glycol ether acetates have been produced for a number of years by esterification of a glycol ether with acetic acid in the presence of an esterification catalyst. The esterification catalyst and residual acetic acid must then be neutralized before purification. Purification is complicated by the azeotropes formed by water with both the glycol ethers and the glycol ether acetates. The reaction and purification steps are further complicated by the complete solubility of acetic acid in water and the relatively high solubility of the glycol ethers and glycol ether acetates in water. In addition, because of corrosion, the equipment utilized in the process must be fabricated from acid resistant material such as stainless steel or glasslined steel.

An objective of this invention, therefore, is to provide an inexpensive method of producing glycol ether acetates.

An additional objective of this invention is to provide a process wherein relatively pure glycol ether acetates can be produced without the complications introduced by the various azeotropes with water.

Yet another object of this invention is to produce glycol ether acetates by a water free process.

A still further object of this invention is to provide a process whereby glycol ether acetates may be produced in conventional mild steel processing equipment.

These and other objects of the invention are accomplished by utilizing the following alcoholysis reaction:

$$R(OCH_2CH_2)_nOH + CH_3CO_2R' \xrightarrow{Catalyst} CH_3CO_2(CH_2CH_2O)_nR + R'OH$$

wherein R and R' represent the same or different saturated aliphatic radicals with one to four carbon atoms and $n$ is equal to 1 or 2.

Suitable feed acetates include methyl acetate, ethyl acetate, propyl acetate, isopropyl acetate, butyl acetate, isobutyl acetate, secondary butyl acetate and tertiary butyl acetate.

Suitable feed ethers include ethylene glycol monomethyl ether, ethylene glycol monoethyl ether, ethylene glycol monopropyl ether, ethylene glycol mono-isopropyl ether, ethylene glycol monobutyl ether, ethylene glycol monoisobutyl ether, ethylene glycol mono-secondary butyl ether, ethylene glycol mono-tertiary butyl ether, diethylene glycol monomethyl ether, diethylene glycol monoethyl ether, diethylene glycol monopropyl ether, diethylene glycol monoisopropyl ether, diethylene glycol monobutyl ether, diethylene glycol monoisobutyl ether, diethylene glycol mono-secondary butyl ether, and diethylene glycol mono-tertiary butyl ether.

Catalysts for the reaction are those ester interchange catalysts which are soluble in esters, which are active and stable at temperatures between about 150° C. and about 225° C., which do not cause decomposition of the reactants or the products within the aforementioned temperature range and which have a low vapor pressure. Suitable catalysts include aluminum alkoxides, titanium alkoxides, and organo-metallic salts such as dialkyltin oxide. Preferably the alkyl portion of the metal alkoxide should be of the same radical as found in the feed acetate. Aluminum isobutoxide is a preferred catalyst for an embodiment of the reaction which utilizes isobutyl acetate feed because of its low cost and easy preparation.

Briefly the process of the invention comprises reacting, in the presence of a suitable catalyst, one mole of a feed glycol ether with from 1.0 to 3.0 moles of a feed alkyl acetate at a modest pressure and a temperature of from about 150° C. to about 225° C., forcing the equilibrium of the reaction in the direction desired by distilling off the product alcohol and subsequently purifying the product alcohol and product glycol ether acetate by conventional distillation techniques.

It was previously known that lower alkyl alcohols azeotrope with lower alkyl acetates at atmospheric pressure. It was completely unexpected that the effect of these azeotropes could be overcome, at temperatures compatible with the catalyst system, by conducting the reaction under modest pressure. It was further unexpected that the catalyst could be separated from the reaction products by simple distillation and that the product alcohol and product glycol ether acetate could be purified by simple distillation.

The process of this invention can be better understood by reference to the drawing wherein a continuous embodiment of the process is illustrated. In the drawing, a feed glycol ether stream 1, a feed acetate stream 2, a make-up catalyst stream 3, a catalyst recycle stream 4 and a product recycle stream 5 are combined in a feed tank 6 to yield the feed for the reactor 7. The proportions of fresh ether, acetate and catalyst feed are adjusted so that the feed to the reactor contains 1.0 to 3.0 moles of feed acetate per mole of feed ether and the catalyst concentration is from about 0.1 to about 1.0 percent based on the weight of the total feed to the reactor.

The temperature and pressure of the reactor are selected to minimize the feed acetate component of the overhead stream 8 removed from the reactor. The pressures will normally be from about 25 psia to about 150 psia and temperatures will be from about 150° C. to about 225° C. The overhead from the reactor 8 goes to the alcohol recovery column 9 wherein the product alcohol is obtained utilizing conventional distillation techniques. Bottoms from column 9 are recycled to the reactor via line 10.

A bottoms stream 11 which comprises the product glycol ether acetate, the catalyst and unreacted feed materials is withdrawn from the reactor and fed to a flash column 12 where the unpurified reactor product is separated from the catalyst by flash distillation. This flash column 12 and the product column 14 are operated at temperatures below about 225° C. to prevent thermal decomposition. For the higher boiling glycol ether acetates it is necessary to operate flash column 12 and product column 14 at less than atmospheric pressure in order to effect the desired separations at temperatures below 225° C. A preferred temperature range for flash column 12 is from about 130° C. to about 180° C. Bottoms from this flash column are recycled to the feed tank 6 via line 4. This comprises the catalyst recycle stream. Overhead 13 from the flash column is fed to a product recovery column 14. Overhead 5 from this product recovery column comprising residual product alcohol, feed acetate and feed ether is recycled to the feed tank 6. The product glycol ether acetate is withdrawn at a vapor take-off 15 near the base of the column. Residual liquid is recycled via line 16 to the flash column 12.

It is understood that the operativeness of this invention is not in any way dependent on recycling the effluent streams such as streams 4, 5, 10, 16 and 17. The decision on recycling any or all of these streams, as shown in the drawing or in any other scheme, is purely a matter of manufacturing economics.

The following examples are set forth for purposes of illustration and it should be understood that they are not to be construed as limiting the invention in any manner.

EXAMPLE 1

Ethylene glycol monoethyl ether acetate is synthesized and purified in a continuous unit. In this synthesis the typical feed to the 1-liter reactor comprises 205 ml. per hour of dry fresh feed mixture and 215 ml. per hour of recycled material. Composition of the total feed is 0.1 percent material which boils below isobutanol, 3.3 percent isobutanol, 67.3 percent isobutyl acetate, 25.0 percent ethylene glycol monoethyl ether, 4.2 percent ethylene glycol monoethyl ether acetate, and 0.7 percent aluminum isobutoxide catalyst. The reactor is operated at 90 psia to separate 90 ml. per hour of overhead product, comprising 0.1 percent material boiling below isobutanol, 99.5 percent isobutanol and 0.4 percent isobutyl acetate. Temperatures along the column average 167° C. at the top, 184° C. at the middle, and 201° C. in the base heater. Base take-off averages 330 ml. per hour which allows a 3-hour residence time in the reactor. Feed ratio is 2.1 moles isobutyl acetate per mole of ethylene glycol monoethyl ether. Conversion per pass is 79.5 mole percent.

Base take-off from the reactor is fed into a flash column where the product is separated from the catalyst. This column is operated at atmospheric pressure. Temperatures along this column average 141° C. at the top and 160° C. in the base heater. Base take-off from this column, averaging 20 ml. per hour, is returned to the reactor.

Overhead take-off from the flash column is fed into a product recovery column. This column is operated at atmospheric pressure to separate isobutanol, isobutyl acetate, and the glycol monoether overhead. The glycol ether acetate product, averaging 115 ml. per hour, is withdrawn at the vapor take-off on the second plate. Base take-off from this column, averaging 15 ml. per hour, is recycled to the flash column feed.

Overhead from the reactor is fed into an alcohol column where residual isobutyl acetate is distilled overhead and pure isobutanol is withdrawn from the vapor take-off at the base of the column. This column is operated at 150 mm. Hg pressure. Temperatures along the column average 65° C. at the top and 81° C. in the base heater. The overhead product and the small base take-off are recycled to the pressure column reactor. The ethylene glycol monoethyl ether acetate product has an APHA color less than 5, an assay of 99.5 to 99.9 percent, and contains less than 0.2 ppm aluminum. Isobutanol product has an APHA color less than 5, an assay of 99.5 to 99.9 percent, and contains less than 0.1 percent isobutyl acetate. Yields are 99.3 mole percent of isobutyl acetate to isobutanol and 99.0 mole percent of ethylene glycol monoethyl ether to ethylene glycol monoethyl ether acetate.

EXAMPLE 2

Ethylene glycol monobutyl ether acetate is synthesized in the continuous unit of Example 1. Typical feed to the reactor comprises 203 ml. per hour of dry fresh feed mixture and 277 ml. per hour of recycled material. Total feed composition is 0.3 percent material which boils below isobutanol, 64.4 percent isobutyl acetate, 2.2 percent isobutanol, 27.2 percent ethylene glycol monobutyl ether, 5.3 percent ethylene glycol monobutyl ether acetate, 0.2 percent material which boils higher than the product, and 0.4 percent aluminum isobutoxide catalyst. The feed ratio is 2.4 moles isobutyl acetate per mole of ethylene glycol monobutyl ether.

The reactor is operated at 90 psia. Temperatures along the column average 165° C. at the top, 177° C. at the middle, and 203° C. in the base heater. Reactor residence time is 2.4 hours and conversion per pass is 88.2 mole percent.

The flash column is operated at 150 mm. Hg pressure to reduce the base temperature to 140° C. and prevent decomposition of the catalyst. All other columns are operated in the same manner as in Example 1, except the temperatures are as shown in Table I.

The ethylene glycol monobutyl ether acetate product has an APHA color less than 5 and an assay of 99.5 to 99.7 percent. Yields are 86.0 mole percent isobutyl acetate to isobutanol and 97.8 mole percent ethylene glycol monobutyl ether to the acetate.

EXAMPLE 3

Ethylene glycol monoethyl ether acetate is synthesized in the continuous unit of Example 1. Total feed to the reactor is in the ratio of 1.75 moles ethyl acetate per mole of ethylene glycol monoethyl ether with 1.0 percent aluminum ethoxide catalyst. The reactor is operated at 90 psia. Temperatures along the column average 133° C. at the top, 148° C. at the middle, and 195° C. in the base heater. Reactor residence time is 3 hours, providing 82 mole percent conversion of ethylene glycol monoethyl ether to the acetate. Overhead product is the azeotrope: 57 percent ethyl alcohol and 43 percent ethyl acetate.

The alcohol column is operated at between 300 mm. Hg pressure and atmospheric pressure. Overhead product is the azeotrope which contains 23 to 31 percent ethyl alcohol and the remainder is ethyl acetate. This azeotrope is recycled to the reactor. The base vapor product passes all specifications for 200-proof USP ethyl alcohol.

All columns are operated in the same manner as Example 1 except the temperatures and pressures are as shown in Table I. Ethylene glycol monoethyl ether acetate has an APHA color less than 5 and an assay of 99.5 to 99.9 percent. The yield of glycol ether to glycol ether acetate is 97.5 mole percent.

EXAMPLE 4

Ethylene glycol monoisobutyl ether acetate is produced in the reactor of Example 1. Feed to the reactor is in the ratio of 2.3 moles ethyl acetate per mole of ethylene glycol monoisobutyl ether and containing 0.3 percent titanium tetraisopropoxide catalyst. The reactor is operated at 90 psia and with a 3-hour residence time. Other temperatures and pressures are as shown in Table I. Conversion of ethylene glycol monoisobutyl ether to its acetate is 92 mole percent and the yield 97.5 mole percent.

EXAMPLE 5

Ethylene glycol monoethyl ether acetate is produced according to the procedure of Example 1. Feed to the reactor is in the ratio of 2.0 moles isobutyl acetate per mole of ethylene glycol monoethyl ether. The total reaction mixture contains 0.3 percent dibutyltin oxide catalyst. The reactor is operated at 90 psia and with a 3-hour residence time. Other temperatures and pressures are as shown in Table I. Conversion of ethylene glycol monoethyl ether to its acetate is 91 mole percent and the yield 99 mole percent.

EXAMPLE 6

Ethylene glycol monoethyl ether acetate is produced according to the procedure of Example 1. Feed to the reactor is in the ratio of 1 mole of isobutyl acetate per mole of ethylene glycol monoethyl ether. The total reaction mixture contains 0.5 percent aluminum isobutoxide catalyst. The pressure column reactor is operated at 80 psia and with 1.2 hours residence time. Other temperatures and pressures are as shown in Table I. Conversion of ethylene glycol monoethyl ether to its acetate is 62.4 mole percent and the yield 99.0 mole percent.

EXAMPLE 7

Diethylene glycol monobutyl ether acetate is produced in the pressure column reactor of Example 1. Feed to the continuous reactor is in the ratio of 2.4 moles ethyl acetate per mole of diethylene glycol monobutyl ether. The total reaction contains 0.38 percent titanium tetraisopropoxide catalyst. The pressure column reactor is operated at 50 psia and with a 3-hour residence time. Other temperatures and pressures are as shown in Table I. Conversion of diethylene glycol monobutyl ether to its acetate is 81.4 mole percent and the yield 96 mole percent.

This product is distilled batchwise in a vacuum distillation column.

Although the invention has been described in detail with particular reference to preferred embodiments thereof, it will be understood that variations and modifications can be effected within the spirit and scope of the invention as described hereinabove.

We claim:

1. A process for the production of glycol ether acetates by reacting an alkyl acetate of the formula $CH_3CO_2R'$ with a glycol ether of the formula $R(OCH_2CH_2)_nOH$ to yield a glycol ether acetate of the formula $R(OCH_2CH_2)_nO_2CCH_3$ and an alcohol having the formula $R'OH$, wherein R and R' are the same or different alkyl groups containing one to four carbon atoms and $n$ is either 1 or 2, which comprises:

a. reacting the alkyl acetate with the glycol ether in a reaction zone in the presence of a catalytic amount of a catalyst selected from the group consisting of aluminum alkoxides, titanium alkoxides and dialkyl tin oxides, at a temperature of from about 150° C. to about 225° C. and a pressure of from about 25 psia to about 150 psia;

b. directing the equilibrium of the reaction to produce the desired product glycol ether acetate by continuous distillative removal of the product alcohol from the reaction zone;

c. withdrawing from the reaction zone a stream comprising catalyst and glycol ether acetate;

d. separating the glycol ether acetate from the catalyst by flash distillation, below about 225° C.; and e. purifying the glycol ether acetate by distillation.

2. The process of claim 1 wherein the feed acetate is selected from the group consisting of methyl acetate, ethyl acetate, propyl acetate, isopropyl acetate, butyl acetate, isobutyl acetate, secondary butyl acetate and tertiary butyl acetate.

3. The process of claim 1 wherein the feed ether is selected from the group consisting of ethylene glycol monomethyl ether, ethylene glycol monoethyl ether,

TABLE I

| Example | | 1, 5 and 6 | 2 | 3 | 4 | 7 |
|---|---|---|---|---|---|---|
| Product | | EG Monoethyl-ether Acetate | EG Monobutyl-ether Acetate | EG Monoethyl-ether Acetate | EG Monoisobutyl-ether Acetate | DEG Monobutyl-ether Acetate |
| D-1 Column (Pressure Reactor) | Base | 201 | 203 | 195 | — | 220 |
| | Middle | 184 | 177 | 148 | 145 | 120 |
| | Top | 167 | 165 | 133 | 133 | 112 |
| | Pressure | 90 | 90 | 90 | 90 | 50 |
| D-2 Column (Alcohol Recovery) | Base | 81 | 81 | 78 | 78 | 78 |
| | Middle | — | — | 72 | 72 | 72 |
| | Top | 65 | 65 | 69 | 69 | 69 |
| | Pressure | 150 | 150 | — | Atm | Atm |
| D-3 Column (Flash) | Base | 160 | 140 | 160 | 190 | 190 |
| | Middle | 153 | 125 | 156 | 180 | 170 |
| | Top | 141 | 110 | 141 | 170 | 160 |
| | Pressure | Atm | 150 | Atm | Atm | 50 mm. |
| D-4 Column (Product Recovery) | Base | 160 | 196 | 160 | 182 | 185 |
| | Middle | 136 | 172 | 136 | 160 | 167 |
| | Top | 116 | 125 | 80 | 80 | 152 |
| | Pressure | Atm | Atm | Atm | Atm | 50 mm. |

NOTE: 1. All temperatures in °C.
2. All pressures in psia unless otherwise noted.

ethylene glycol monopropyl ether, ethylene glycol monoisopropyl ether, ethylene glycol monobutyl ether, ethylene glycol monoisobutyl ether, ethylene glycol mono-secondary butyl ether, ethylene glycol mono-tertiary butyl ether, diethylene glycol monomethyl ether, diethylene glycol monoethyl ether, diethylene glycol monopropyl ether, diethylene glycol monoisopropyl ether, diethylene glycol monobutyl ether, diethylene glycol monoisobutyl ether, diethylene glycol mono-secondary butyl ether and diethylene glycol mono-tertiary butyl ether.

4. The process of claim 1 wherein the catalyst is selected from the group consisting of aluminum isobutoxide, aluminum ethoxide, titanium tetraisobutoxide, and dibutyltin oxide.

5. The process of claim 1 wherein the ratio of alkyl acetate to glycol ether is from about 1.0 to about 3.0 moles of alkyl acetate per mole of glycol ether.

6. The process of claim 1 wherein the average resident time of the reactant in the reactor is from about 0.5 to about 4.0 hours.

7. The process of claim 1 wherein the average resident time of the reactants in the reactor is from about 0.5 to about 2.0 hours.

8. The process of claim 1 wherein the distillative separation of the product glycol ether acetate from the catalyst is performed at from about 130° C. to about 180° C.

9. A process for the continuous production of a glycol ether acetate which comprises:
   a. continuously introducing into a reaction vessel a feed stream which comprises a catalytic amount of a catalyst selected from the group consisting of aluminum alkoxides, titanium alkoxides, and dialkyl tin oxides, an alkyl acetate of the formula $CH_3CO_2R'$ and a glycol ether of the formula $R(OCH_2CH_2)_nOH$ in the ratio of from about 1.0 to about 3.0 moles of alkyl acetate per mole of glycol ether, wherein R and R' are the same or different alkyl groups containing one to four carbon atoms and $n$ is either 1 or 2;
   b. causing the alkyl acetate to react with the glycol ether to form a glycol ether acetate and an alcohol by maintaining the temperature in the reaction vessel at from about 150° C. to about 225° C. and the pressure therein at from about 25 psia to about 150 psia;
   c. influencing the equilibrium of the reaction mixture towards the production of the glycol ether acetate by continuous distillative removal of the alcohol;
   d. continuously withdrawing from the base of the reaction zone a stream comprising catalyst and glycol ether acetate;
   e. separating the glycol ether acetate from the catalyst by flash distillation at a temperature less than about 225° C.; and
   f. purifying the glycol ether acetate by distilling at a pressure which permits the distillation to occur with a base heater temperature of less than about 225° C.

10. The process of claim 9 wherein the alkyl acetate is isobutyl acetate and the glycol ether is selected from the group comprising ethylene glycol monoethyl ether, ethylene glycol monoisobutyl ether and ethylene glycol monobutyl ether.

* * * * *

PO-1050
(5/69)

UNITED STATES PATENT OFFICE
CERTIFICATE OF CORRECTION

Patent No. _____3,700,726_____ Dated _____October 24, 1972_____

Inventor(s) _Sam H. Johnson, Jr., and Howard N. Wright, Jr._

It is certified that error appears in the above-identified patent and that said Letters Patent are hereby corrected as shown below:

In the Abstract, line 4 should read ---$_2CH_2O)_nR + R'OH$---.

Column 1, line 42, delete " ⇌ " at the end of the line.

Signed and sealed this 29th day of May 1973.

(SEAL)
Attest:

EDWARD M. FLETCHER, JR.
Attesting Officer

ROBERT GOTTSCHALK
Commissioner of Patents